United States Patent
Singh et al.

(10) Patent No.: US 8,909,649 B2
(45) Date of Patent: Dec. 9, 2014

(54) METHOD, APPARATUS, AND COMPUTER PROGRAM PRODUCT FOR CONTENT MANAGEMENT

(75) Inventors: Jaspal Singh, Boulder, CO (US); Becky Williams, Lakewood, CO (US)

(73) Assignee: McKesson Financial Holdings, Hamilton (BM)

( * ) Notice: Subject to any disclaimer, the term of this patent is extended or adjusted under 35 U.S.C. 154(b) by 103 days.

(21) Appl. No.: 13/451,978

(22) Filed: Apr. 20, 2012

(65) Prior Publication Data
US 2013/0282652 A1    Oct. 24, 2013

(51) Int. Cl.
G06F 17/30    (2006.01)

(52) U.S. Cl.
USPC .......................................... 707/741

(58) Field of Classification Search
None
See application file for complete search history.

(56) References Cited

U.S. PATENT DOCUMENTS

| | | | |
|---|---|---|---|
| 6,466,983 B1* | 10/2002 | Strazza | 709/227 |
| 2008/0010648 A1* | 1/2008 | Ando et al. | 719/328 |
| 2009/0183072 A1 | 7/2009 | Stephenson et al. | |
| 2009/0199097 A1 | 8/2009 | Black et al. | |
| 2010/0070448 A1* | 3/2010 | Omoigui | 706/47 |
| 2010/0217663 A1* | 8/2010 | Ramer et al. | 705/14.42 |
| 2012/0191716 A1* | 7/2012 | Omoigui | 707/740 |

* cited by examiner

Primary Examiner — Wilson Lee
(74) Attorney, Agent, or Firm — Alston & Bird LLP (57) ABSTRACT

A method for managing content is provided. The method may include, by a content management apparatus, receiving a content request, searching for content information associated with the request, and causing writing of missing content information to an alert file. The method may provide default content information when content information is not otherwise located. A content request may comprise an application and context name. A response from a content management apparatus may comprise a location and map identifier used by a calling apparatus to locate and cause display of content. The method may provide synchronization capabilities in which content referenced by an application is searched for in order to track missing content in an alerts file, and to track the synchronization history or status of an application in a synchronization log. Corresponding systems, apparatuses, and computer program products are also provided.

22 Claims, 6 Drawing Sheets

METHOD, APPARATUS, AND COMPUTER PROGRAM PRODUCT FOR CONTENT MANAGEMENT

TECHNOLOGICAL FIELD

Embodiments of the present invention relate generally to computer technology and, more particularly, relate to methods, apparatuses, and computer program products for managing content.

BACKGROUND

The widespread use of modern computing technology has led to an increasing demand for information to be made available via computer-based applications. As institutions and other organizations in various industries continue to expand their systems, the size and complexities of their workforces developing and maintaining the systems may also increase. In this regard, different entities within an organization may be responsible for developing and maintaining various applications. A team tasked with developing a portion of a system, such as, for example, a web page, may complete development of the web page. A separate division may provide the content, including documents, text, images, or the like, for displaying on the page.

Several inefficiencies are introduced by the increasing complexity and size of systems, organizations implementing the systems, and information made available by the systems. In many cases, the same content may be accessed from various parts of an application or system. Duplication of such content may result in wasted memory, wasted manpower in maintaining the content in the event changes are needed and future inconsistencies across duplicate items due to failure to recognize the need for changes in more than one location. Additionally, some applications may require a full build and application-wide testing in order to make a change to content as simple as correcting a typo.

BRIEF SUMMARY OF SOME EXAMPLE EMBODIMENTS

Methods, apparatuses, and computer program products are therefore provided for improving content management. In this regard, content management refers to creating, organizing, deploying, storing, maintaining, and/or retrieving content. Embodiments provided herein may provide several advantages to application development teams, including allowing flexible addition or modification of content, improving communication among team members or teams to ensure synchronization of application code and content, and minimizing duplicate content. Additionally, an organization as a whole may reduce their operating costs by realizing any combination of these improvements in their content management processes, and therefore also reduce costs to their clients.

In a first example embodiment, a method is provided, comprising receiving at least one content request and searching for content information associated with the content request. In an instance in which content information is located, the method comprises providing the content information. In an instance in which the content is not located, the method comprises causing writing of at least one alert associated with missing content information to an alert file.

In another example embodiment, the at least one content request may comprise an application name and application context, and the content information may comprise a location and map identifier. In some embodiments, searching for content information may comprise identifying the map identifier in a product context map based on at least one of the application name and application context, and identifying the location in a product location map based on at least the application name. In an additional example embodiment, a method is provided for causing display of content based on at least the location and map identifier.

In some embodiments, a method is provided for receiving an application synchronization request and causing writing of application synchronization information to a synchronization log. In another embodiment, a default content information may be provided in an instance in which content is not located. In some embodiments, the method may be performed by a web-based system.

Additionally, in one embodiment, an apparatus for managing content is provided. The apparatus comprises processing circuitry configured to cause the apparatus to at least receive at least one content request and search for content information associated with the content request. The processing circuitry is configured to provide the content, or in an instance in which content information is not located, cause writing of at least one alert to an alert file. In some embodiments, the at least one content request may comprise an application name and application context, and content information may comprise a location and map identifier. In some embodiments, searching for content information may comprise identifying the map identifier in a product context map based on at least one of the application name and application context, and identifying the location in a product location map based on at least the application name. In additional example embodiment, the processing circuitry may be further configured to cause display of content based on at least the location and map identifier.

In some embodiments, the processing circuitry is further configured to receive an application synchronization request and cause writing of application synchronization information to a synchronization log. In another embodiment, a default content information may be provided in an instance in which content is not located.

According to another embodiment, a computer program product for managing content is provided, comprising at least one non-transitory computer-readable medium having computer-readable program instruction stored therein, the computer-readable program instructions comprising instructions, which when performed by an apparatus are configured to cause the apparatus to at least receive at least one content request and search for content information associated with the content request, provide the content, or in an instance in which content information is not located, cause writing of at least one alert to an alert file. In some embodiments, the at least one content request may comprise an application name and application context, and the content information may comprise a location and map identifier. In some embodiments, searching for content information may comprise identifying the map identifier in a product context map based on at least one of the application name and application context, and identifying the location in a product location map based on at least the application name. In additional example embodiment, the instruction may be further configured to cause display of content based on at least the location and map identifier.

In some embodiments, the instruction may be further configured to receive an application synchronization request and cause writing of application synchronization information to a synchronization log. In another embodiment, a default content information may be provided in an instance in which content is not located.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE SEVERAL VIEWS OF THE DRAWINGS

Having thus described embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, where a computing device is described herein to receive data from another computing device, it will be appreciated that the data may be received directly from the another computing device and/or may be received indirectly via one or more intermediary computing devices, such as, for example, one or more servers, relays, routers, network access points, and/or the like. Similarly, where a computing device is described herein to send data to another computing device, it will be appreciated that the data may be sent directly to the another computing device or may be sent to the another computing device via one or more interlinking computing devices, such as, for example, one or more servers, relays, routers, network access points, and/or the like.

Figure 1:
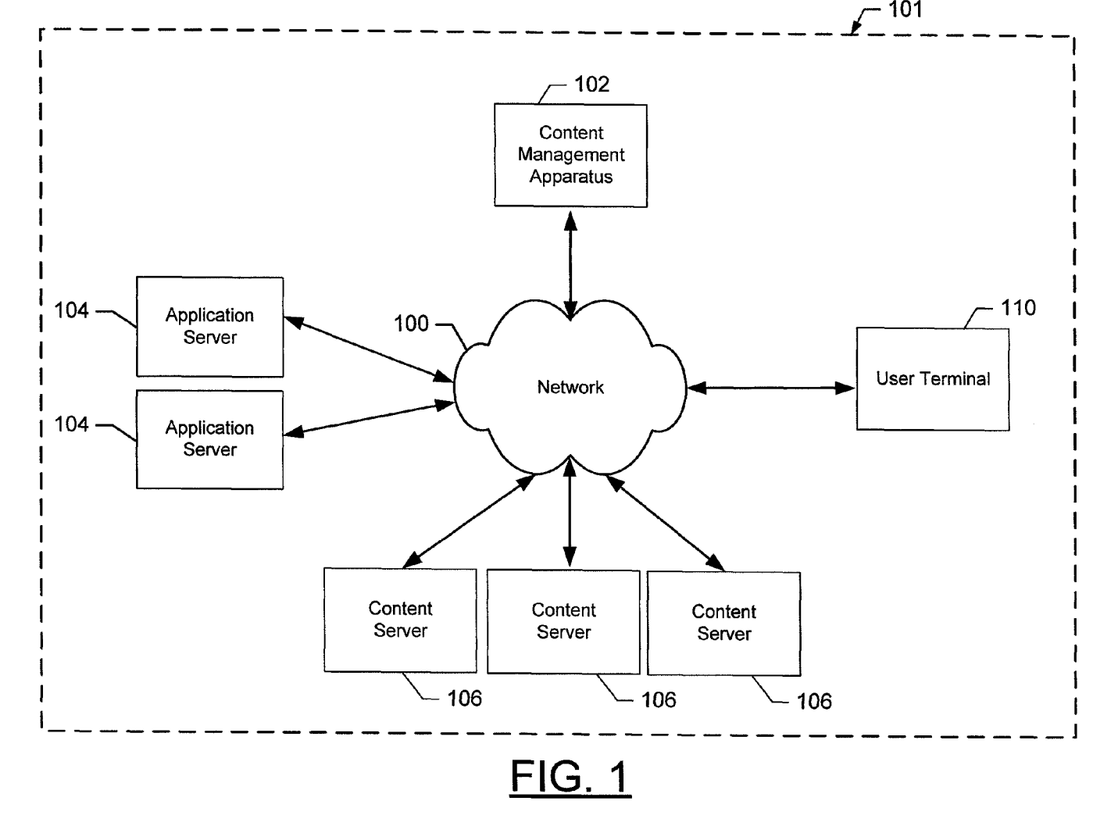
FIG. 1 illustrates a system for managing content according to some example embodiments.

FIG. 1 illustrates a system 101 for managing content according to some example embodiments. It will be appreciated that the system 101 as well as the illustrations in other figures are each provided as an example of an embodiment(s) and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for managing content, numerous other configurations may also be used to implement embodiments of the present invention.

The system 101 may include content management apparatus 102 that may be configured to provide content information to one or more application servers 104. In this regard, content may comprise documents, text, images, or the like, and be in a variety of formats such as HyperText Markup Language (HTML), uniform resource locators (URLs), and/or the like. Content may comprise providing instructions to access other content, code rendering other content, and/or the like. Content information may comprise any information or metadata used by application server(s) 104 to locate and render content, and/or an indication of whether or not content is available.

The application server(s) 104 may support and/or provide application code written in a variety of languages, and may be a third party application server and/or an open source server. Types of application server(s) 104 may include, but are not limited to Tomcat, JBoss, Websphere, and any other type of application server. Content management apparatus 102 may be configured to communicate with application server(s) 104 via any of a variety of methods dependent upon the configuration of the system 101. For example, in embodiments in which a content management apparatus 102 is disposed remotely from the application server(s) 104, content information may be provided to the application server(s) 104 via a network 100, by a variety of connections. Network 100 may be embodied in a local area network, the Internet, any other form of a network, or in any combination thereof, including proprietary private and semi-private networks and public networks. The network 100 may comprise a wireline network, wireless network (e.g., a cellular network, wireless local area network, wireless wide area network, some combination thereof, or the like), or a combination thereof, and in some example embodiments comprises at least a portion of the Internet. As another example, a content management apparatus 102 may be directly coupled to the application server(s) 104, and content information may be provided from a content management apparatus 102 to the application server(s) 104 via a direct connection.

Figure 2:
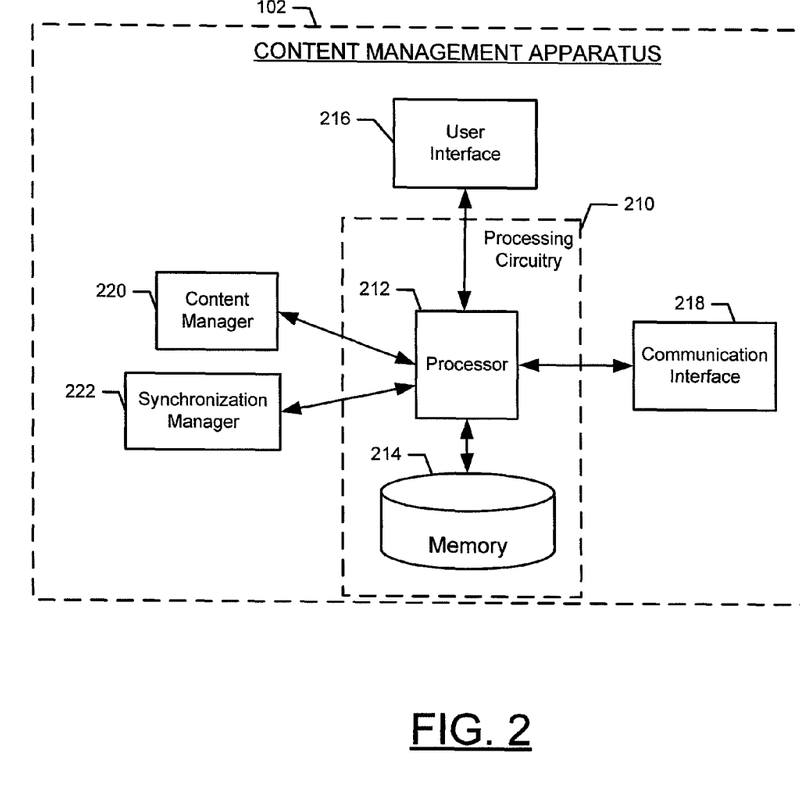
FIG. 2 illustrates a block diagram of a content management apparatus in accordance with some example embodiments.

In some example embodiments, content management apparatus 102 may be embodied as or comprise one or more computing devices, such as, by way of non-limiting example, a server, configured to access network 100 and/or application server(s) 104. In some example embodiments, content management apparatus 102 may be implemented as a distributed system or a cloud based entity that may be implemented within network 100. In this regard, content management apparatus 102 may comprise one or more servers, a server cluster, one or more network nodes, a cloud computing infrastructure, some combination thereof, or the like. In some embodiments, content management apparatus 102 may be implemented in the same apparatus as one or more application servers (104). An example embodiment of content management apparatus 102 is illustrated in FIG. 2 and is described in further detail hereinafter.

Continuing with FIG. 1, system 101 may also include one or more content servers 106 to store and support retrieval of content. Content server(s) 106 may comprise one or more computing devices configured to store and support retrieval of content. In this regard, content server(s) 106 may comprise one or more servers, a server cluster, one or more network nodes, a cloud computing infrastructure, some combination thereof, or the like that may be configured to store and/or provide access to content. Content server(s) 106 also may comprise a database of content or may be configured to access such a database.

Content server(s) 106 may be directly coupled to application server(s) 104 and/or content management apparatus 102 to transmit content. In some embodiments, the content server(s) 106 may be implemented on the application server(s) 104, on the content management apparatus 102, or in any combination thereof.

Continuing with FIG. 1, system 101 may additionally and optionally comprise any number of user terminals 110, which may, for example, be embodied as a laptop computer, tablet computer, mobile phone, desktop computer, workstation, or other like computing device. A user terminal 110 may be remote from the content management apparatus 102, application server(s) 104, and/or content server(s) 106, in which case the user terminal 110 may communicate with any of the respective apparatuses via network 100. Additionally or alternatively, the user terminal 110 may be implemented on content management apparatus 102, application server(s) 104, and/or content server(s) 106.

FIG. 2 illustrates a content management apparatus 102 in further detail, in accordance with some example embodiments. However, it should be noted that the components, devices, and elements illustrated in and described with respect to FIG. 2 below may not be mandatory and thus some may be omitted in certain embodiments. Additionally, some embodiments may include further or different components, devices, or elements beyond those illustrated in and described with respect to FIG. 2.

Continuing with FIG. 2, processing circuitry 210 may be configured to perform actions in accordance with one or more example embodiments disclosed herein. In this regard, the processing circuitry 210 may be configured to perform and/or control performance of one or more functionalities of the content management apparatus 102 in accordance with various example embodiments. The processing circuitry 210 may be configured to perform data processing, application execution, and/or other processing and management services according to one or more example embodiments. In some embodiments, the content management apparatus 102 or a portion(s) or component(s) thereof, such as the processing circuitry 210, may be embodied as or comprise a circuit chip. The circuit chip may constitute means for performing one or more operations for providing the functionalities described herein.

In some example embodiments, the processing circuitry 210 may include a processor 212 and, in some embodiments, such as that illustrated in FIG. 2, may further include memory 214. The processing circuitry 210 may be in communication with or otherwise control a user interface 216, a content manager 220, synchronization manager 222, and/or a communication interface 218. As such, the processing circuitry 210 may be embodied as a circuit chip (e.g., an integrated circuit chip) configured (e.g., with hardware, software, or a combination of hardware and software) to perform operations described herein.

The processor 212 may be embodied in a number of different ways. For example, the processor 212 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. Although illustrated as a single processor, it will be appreciated that the processor 212 may comprise a plurality of processors. The plurality of processors may be in operative communication with each other and may be collectively configured to perform one or more functionalities of content management apparatus 102 as described herein. The plurality of processors may be embodied on a single computing device or distributed across a plurality of computing devices collectively configured to function as the content management apparatus 102. In some example embodiments, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA, or the like, the processor 212 may be specifically configured hardware for conducting the operations described herein. Alternatively, as another example, when the processor 212 is embodied as an executor of software instructions, the instructions may specifically configure the processor 212 to perform one or more operations described herein.

In some example embodiments, the memory 214 may include one or more non-transitory memory devices such as, for example, volatile and/or non-volatile memory that may be either fixed or removable. In this regard, the memory 214 may comprise a non-transitory computer-readable storage medium. It will be appreciated that while the memory 214 is illustrated as a single memory, the memory 214 may comprise a plurality of memories. The plurality of memories may be embodied on a single computing device or may be distributed across a plurality of computing devices collectively configured to function as the content management apparatus 102. The memory 214 may be configured to store information, data, applications, instructions and/or the like for enabling the content management apparatus 102 to carry out various functions in accordance with one or more example embodiments. For example, the memory 214 may be configured to buffer input data for processing by the processor 212. Additionally or alternatively, the memory 214 may be configured to store instructions for execution by the processor 212. As yet another alternative, the memory 214 may include one or more databases that may store a variety of files, contents, or data sets. Among the contents of the memory 214, applications may be stored for execution by the processor 212 to carry out the functionality associated with each respective application. In some cases, the memory 214 may be in communication with one or more of the processor 212, user interface 216, communication interface 218, content manager 220, or synchronization manager 222 for passing information among components of content management apparatus 102.

The user interface 216 may be in communication with the processing circuitry 210 to receive an indication of a user input at the user interface 216 and/or to provide an audible, visual, mechanical, or other output to the user. As such, the user interface 216 may include, for example, a keyboard, a mouse, a joystick, a display, a touch screen display, a microphone, a speaker, and/or other input/output mechanisms. As such, the user interface 216 may, in some example embodiments, provide means for user control of content management operations and/or the like. In some example embodiments in which the content management apparatus 102 is embodied as a server, cloud computing system, or the like, aspects of user interface 216 may be limited or the user interface 216 may not be present. In some example embodiments, one or more aspects of the user interface 216 may be implemented on a user terminal 110. Accordingly, regardless of implementation, the user interface 216 may provide input and output means to facilitate content management in accordance with one or more example embodiments.

The communication interface 218 may include one or more interface mechanisms for enabling communication with other devices and/or networks. In some cases, the communication interface 218 may be any means such as a device or circuitry embodied in either hardware, or a combination of hardware and software that is configured to receive and/or transmit data from/to a network and/or any other device or module in communication with the processing circuitry 210. By way of example, the communication interface 218 may be configured to enable content management apparatus 102 to communicate application server(s) 104, content server(s) 106, and/or user terminal 110 via network 100. Accordingly, the communication interface 218 may, for example, include supporting hardware and/or software for enabling communications via cable, digital subscriber line (DSL), universal serial bus (USB), Ethernet, or other methods.

In some example embodiments, the processor 212 (or the processing circuitry 210) may be embodied as, include, or otherwise control a content manager 220. As such, the content manager 220 may be embodied as various means, such as circuitry, hardware, a computer program product comprising computer readable program instructions stored on a computer readable medium (for example, the memory 214) and executed by a processing device (for example, the processor 212), or some combination thereof. Content manager 220 may be capable of communication with one or more of the processor 212, memory 214, user interface 216, communication interface 218, and synchronization manager 222 to access, receive, and/or send data as may be needed to perform one or more of the functionalities of the content manager 220 as described herein. In some example embodiments, content manager 220 may be implemented as a web service, such as, for example, those created using Apache Axis platform. It will be appreciated that implementing content manager 220 as a web service is cited as a non-limiting example, and should not be construed to narrow the scope or spirit of the disclosure in any way.

Content management apparatus 102 may include, in some embodiments, a synchronization manager 222 configured to perform functionalities as described herein. Processor 212 (or the processing circuitry 210) may be embodied as, include, or otherwise control a synchronization manager 222. As such, the synchronization manager 222 may be embodied as various means, such as circuitry, hardware, a computer program product comprising computer readable program instructions stored on a computer readable medium (for example, the memory 214) and executed by a processing device (for example, the processor 212), or some combination thereof. Synchronization manager 222 may be capable of communication with one or more of the processor 212, memory 214, user interface 216, communication interface 218, and content manager 220 to access, receive, and/or send data as may be needed to perform one or more of the functionalities of the synchronization manager 222 as described herein. Additionally, or alternatively, synchronization manager 222 may be implemented on content manager 220. In some example embodiments in which the content management apparatus 102 is embodied as a server cluster, cloud computing system, or the like, content manager 220 and synchronization manager 222 may be implemented on different apparatuses. Like content manager 220, synchronization manager 222 may be implemented as a web service, however, it will again be appreciated that synchronization manager 222 may be implemented using a variety of architectures, and that a web service implementation is provided merely as example.

FIGS. 3, 4, 5 and 6 are flowcharts of operations according to some embodiments. Operations illustrated in FIGS. 3, 4, 5 and 6 may be performed by a content management apparatus and, more particularly, may be performed by, with the assistance of, and/or under the control of one or more of the processing circuitry 210, processor 212, memory 214, user interface 216, communication interface 218, content manager 220, and synchronization manager 222.

Figure 3:
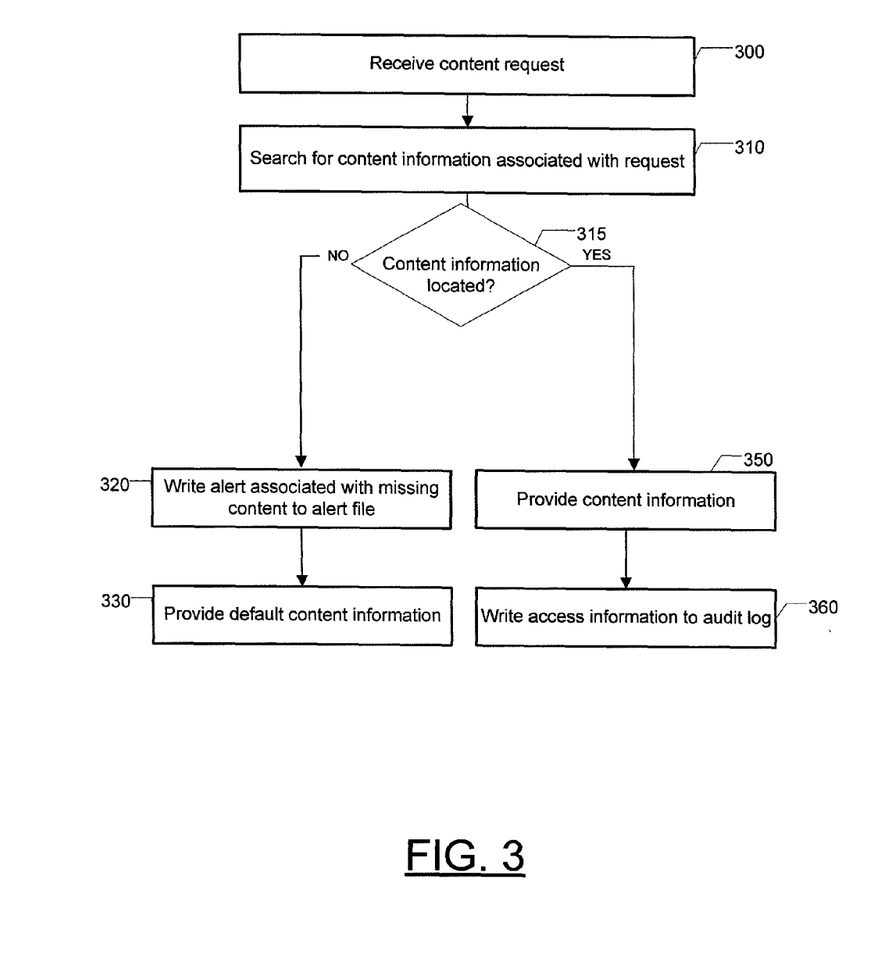
FIG. 3 illustrates a flowchart according to some example embodiments.

In FIG. 3, at operation 300, a content management apparatus, such as, for example, content management apparatus 102, may receive a content request. In this regard, a content request may comprise any identifier(s), or the like required by content manager 220 to distinguish content information, and when available, provide associated content information. The content request may be generated on an application server, such as, for example, an application server(s) 104, and may be communicated to a content management apparatus via a network, such as, for example, network 100. Additionally or alternatively, a content request may be received directly from an application server. The content management apparatus, and more specifically, the content manager 220, may receive a content request via communication interface 218, in a variety of formats. For example, in some embodiments in which the content manager 220 is embodied as a web service, the content request may be received from a web service client. The request, for example, may be communicated via a protocol such as Simple Object Access Protocol (SOAP), and/or the like. However, it should be appreciated that the content request may be communicated by any available interface between the application server and content management apparatus.

At operation 310, the content manager 220, under the control of a processor 212, may search for content information associated with the content request. The content management apparatus may perform the search by utilizing any or all data comprising the content request and accessing information stored at memory 214. The search may be implemented in a variety ways, such as, for example, traversing a file of content request identifiers paired with corresponding content information. Or, the content manager may utilize the content request data to search in any type of file, database, or the like. For example, the content manager may access an Extensible Markup Language (XML) file, and search for an element associated with the content request.

At operation 315, the content manager may initiate different subsequent operations depending on whether or not content is located. In instances in which the content manager locates content information associated with the content request, at operation 350, it may retrieve the content information from memory and transmit the content information from communication interface 218 to an application server via a direct connection or via a network, such as network 100. The content information may be communicated in various formats, such as, for example, a web service response, such as a SOAP response message, or any other format used to communicate content information such that an application server may utilize the content information to locate and cause display of associated content, either independently, by use of a content server 106, content management apparatus 102, or any combination thereof.

According to some embodiments, at operation 360, the content manager may write access information to an audit log including but not limited to a content identifier, a time and date the content was accessed, and/or an identifier associated with the user who accessed the content.

In instances in which the content manager fails to locate content information associated with the content request, at operation 320, the content manager causes writing of an alert to an alert file. Such an alert file may be stored on memory 214, an application server, or any other device in system 101. The alert may comprise information such as the date and/or time the search and/or request was performed, content request information associated with the missing content information, and/or any other information. In some embodiments, system 101 may comprise a single alert file, or any number of alert files. For example, in some embodiments, there may be an alert file for every application, or every application server. In instances in which the content manager cannot locate an appropriate alert file, the content manager may initiate the creation of the alert file in order to write to it.

Continuing to operation 330, in instances in which the content manager fails to locate content information associated with the content request, the content manager may locate default content information associated with the content request. In this regard, the content manager may identify, in its search, default content information having some association to the content request. In such an instance, the content manager may retrieve and transmit the default content information from communication interface 218 to an application server via a direct connection or via a network, such as network 100, via any combination of formats as described herein in regard to transmitting content information.

Figure 4:
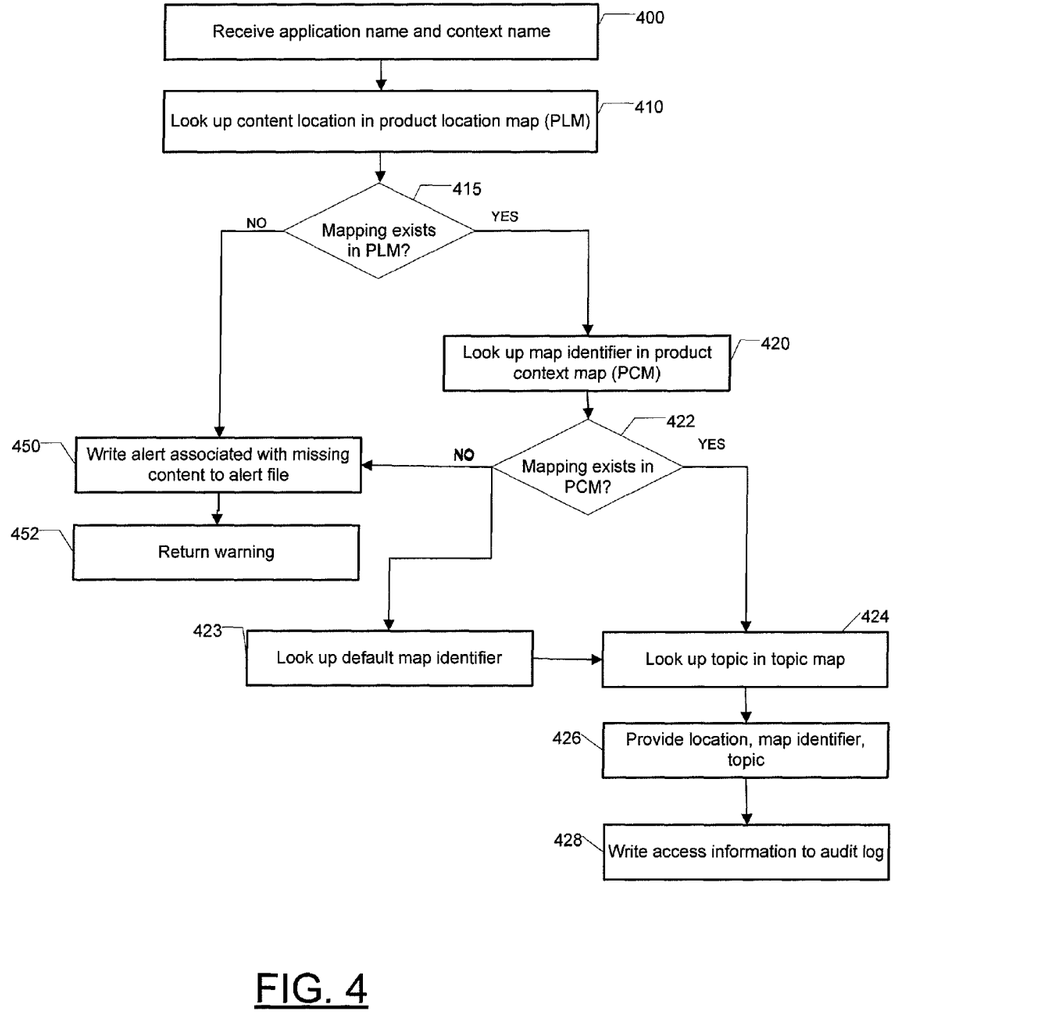
FIG. 4 illustrates a flowchart according to other example embodiments.

FIG. 4 is a flowchart according to some example embodiments implementing context sensitive help (CSH) on a web-based system, where the content manager is implemented as a web service. In this regard, the content manager performing operations of FIG. 4 will hereinafter be referred to as the help service. At operation 400, the help service may receive a content request that may comprise an application name, application context, and/or other information. In a more specific example, an application called, Horizon Emergency Care™ running on a web-based system and used by nurses in a hospital operating room may utilize the help service. Operation 400, therefore may be invoked, for example, by a user at user terminal 110 selecting a help icon on a "history and physical exam" screen, therefore causing an application server 104 to invoke the help service and receive a content request comprising an application name, "HEC" and context name "history_and_physical_exam." In some embodiments, at operation 410, the help service may search for a location of the requested content in a product location map (PLM) that may be stored on, for example memory 214 and include a mapping of applications to content locations. The PLM may be an XML file, such as, for example, the following PLM:

```
<?xml version="1.0" encoding="UTF-8"?>
<HELPMAP>
    <MAPPINGS>
        <HELP>
            <APPLICATION>HEC</APPLICATION>
            <LOCATION>http://cinder.clinicom.com:12304/help/hec/hec.htm
            </LOCATION>
        </HELP>
        <HELP>
            <APPLICATION>HCCT</APPLICATION>
            <LOCATION>http://alero.clinicom.com:12304/help/hcct/hcct.htm
            </LOCATION>
        </HELP>
    </MAPPINGS>
</HELPMAP>
```

The help service initiates different operations, at operation 415, depending on whether or not an application is located in the PLM. The help service may locate an element associated with the content request comprising the application name and/or context name, and identify a location associated with the content request. In the example PLM provided above, the location comprises a server, port, directory and file name, which together, provides a URL for a default start file, which may comprise computer program instructions to invoke additional content and/or computer program instructions. However, it will be appreciated that the location may comprise any information used to identify a location of the requested content.

Continuing to operation 420, the help service may look up a map identifier for the context defined in the content request in a product context map (PCM) that includes a mapping of contexts to map identifiers. In some example embodiments, such as an embodiment performing operations according to FIG. 4, each application may have its own PCM, stored on, for example, application server(s) 104 or memory 214 of the content management apparatus. The help service may identify the appropriate PCM by its title, such as in the following example, which is an XML file, entitled "productContextMapHEC.xml":

```
<?xml version="1.0" encoding="UTF-8"?>
<HELPMAP>
    <MAPPINGS>
        <HELP>
            <CONTEXT></CONTEXT>
            <MAPNUMBER>1004010105</MAPNUMBER>
        </HELP>
        <HELP>
            <CONTEXT>md_disposition</CONTEXT>
            <MAPNUMBER>1004010136</MAPNUMBER>
        </HELP>
        <HELP>
            <CONTEXT>history_and_physical</CONTEXT>
            <MAPNUMBER>1004010237</MAPNUMBER>
        </HELP>
    </MAPPINGS>
</HELPMAP>
```

The help service may locate a map identifier for the given context in the PCM. In this example, the map identifier is a number, but it should be appreciated that the map identifier could be in any format.

Continuing to operation 422, if the help service identifies an appropriate context mapping in the PCM, the help service may use the previously identified map identifier to look up a topic name in a topic map that includes a mapping of map identifiers to topic names, at operation 424. In some example embodiments each application may have its own topic map, stored on, for example, application server(s) 104 or memory 214 of the content management apparatus. The topic map may be an XML file, such as, for example, the following topic map, which may be located by its name "topicMapHEC.xml":

```
<?xml version="1.0" encoding="UTF-8"?>
<HELPMAP>
    <MAPPINGS>
        <TOPIC>
            <MAPNUMBER>1004010105</MAPNUMBER>
            <TOPICNAME>#horizon_emergency_care_help.htm</TOPICNAME>
        </TOPIC>
        <TOPIC>
```

```
    <MAPNUMBER>1004010136</MAPNUMBER>
    <TOPICNAME>#disposition\md_disposition_patient_using_single_worksheet.htm</TOPICNAME>
      </TOPIC>
      <TOPIC>
        <MAPNUMBER>1004010237</MAPNUMBER>
    <TOPICNAME#MD_completing_emergency_chart\md_complete_the_history_and_physical_exam_
    worksheet.htm </TOPICNAME>
      </TOPIC>
  </MAPPINGS>
</HELPMAP>
```

The help service may locate a topic name for the given context in the topic map. In this example, the topic name is a file name for a file containing the topic name, but it should be appreciated that the topic name may be in any format. In this particular example, there is a one to one correspondence between map numbers and topic names, therefore it will be appreciated that either a map number, topic name, or both, may serve as a map identifier.

In some embodiments, in instances in which the help service cannot identify a location mapping for a particular application in a PLM and/or a context mapping for a particular context in a PCM, the help service may cause writing of an alert to an alert file, at operation 450, utilizing methods described herein. An example alert file follows:

```
***************************************************
Run on mm/dd/yy, hh:mm:ss
***************************************************
Mapping not found for following HEC contexts:
<CONTEXT>rn_chart</CONTEXT>
<CONTEXT>edit_allergy</CONTEXT>
***************************************************
```

"Mm/dd/yy" serves as placeholders for the timestamp representing the date and time the application was invoked, causing the alert to be printed and/or the date and time synchronization was triggered. The two example contexts are contexts for which content information was not located with respect to application HEC. Additionally or alternatively, at operation 452, in instances in which the help service cannot locate a requested PLM entry, a warning may be returned, that may be received by, for example, application server 104, which in turn may cause display of a warning message.

In some embodiments, in instances in which the help service can identify a location mapping for a particular application in a PLM, but not a context mapping for the requested context in a PCM, the help service may locate a default map identifier, at operation 423. In the "productContext-MapHEC.xml" file above, the empty context tags, "<CONTEXT></CONTEXT>" allow the help service to identify the corresponding map identifier as default content information. According to some embodiments, a default context mapping may not be required in order to utilize default content information. Rather, absence of a requested context and absence of empty context tags may merely result in content information comprising only a location.

Continuing to operation 426, the help service may return a location, map identifier, and/or topic to application server(s) 104 via communication interface 218. As such, the content information may be communicated via a variety of methods. In some example embodiments, the response containing the content information may comprise a Java bean. Depending on the implementation of an application, application server(s) may utilize the content information in a variety of ways to display the requested content. In the HEC example, computer program instructions implemented on application server(s) may cause the topic name to be appended to the location in order to retrieve the correct content from content server(s) 106 and cause the content to be displayed on user terminal 110. Alternatively, or additionally, in an example embodiment the location alone could be used in order to show default content, and/or content relating to a more general, parent topic. According to some embodiments, at operation 428, access information may be written to an audit log. Such information may include, but is not limited to a content identifier(s) such as a location, map identifier and/or topic, a time and date the content was accessed, and/or an identifier associated with the user who accessed the content.

It will be appreciated that a system implementing context sensitive help is provided as an example, and is not intended to be limiting. Another example of a content management system that may implement an example embodiment provided herein is one that provides content for company policies. In an embodiment providing content for company policies, audit logs may be particularly beneficial in that the logs may provide evidence that a specific employee accessed a policy at a specific time. For example, a hospital implementing such a content management system and audit log(s) may access the log(s) to ensure employees follow vital procedures and access policies and other clinical content.

Figure 5:
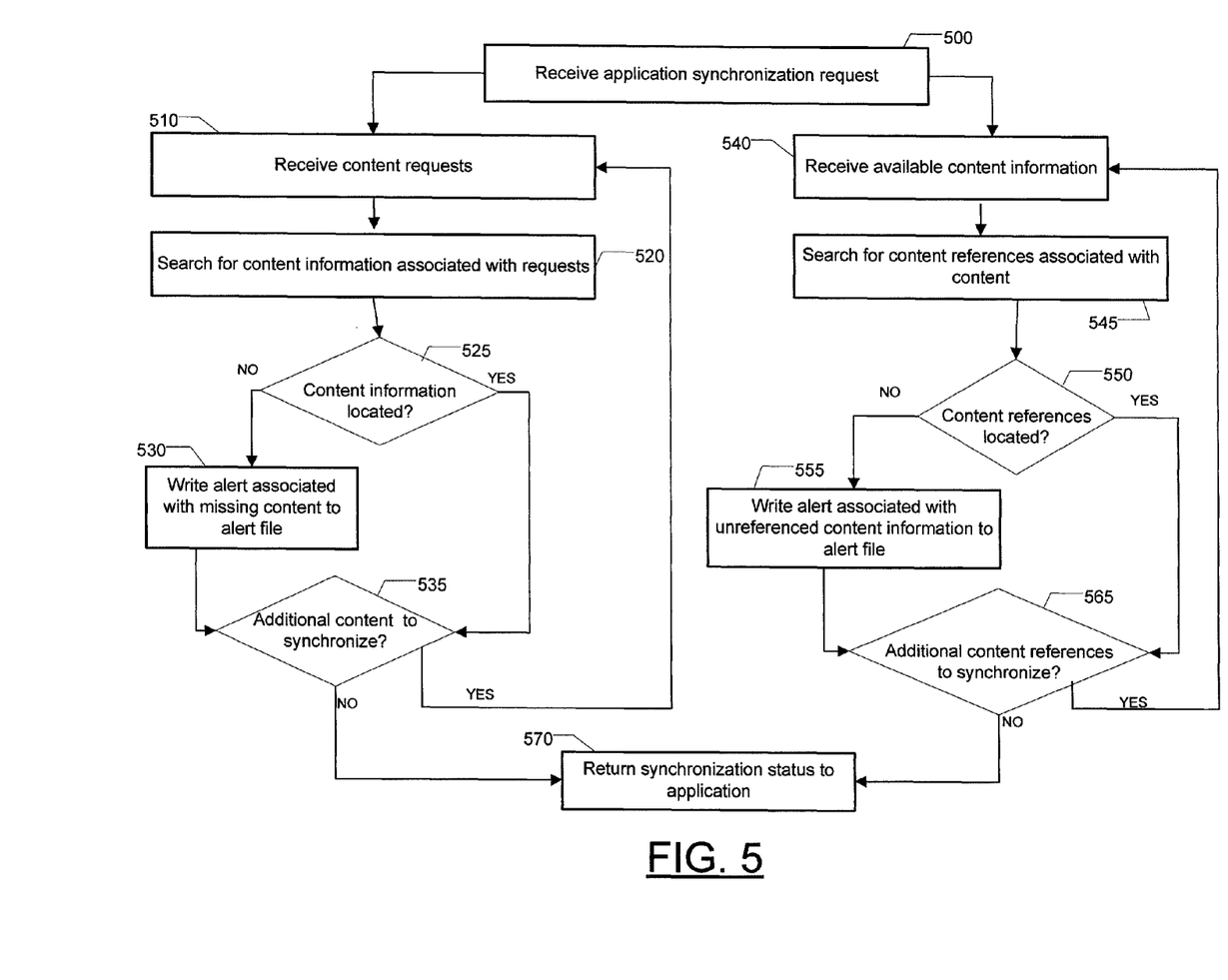
FIG. 5 illustrates a flowchart according to further example embodiments.

Continuing to FIG. 5, a content management apparatus, such as content management apparatus 102, may also synchronize applications with their content. In this regard, an application synchronization may result in a search for all content referenced by an application, causing writing of alerts in instances in which content is missing, and tracking the synchronization activities in a synchronization log. At operation 500, the content management apparatus, or more specifically, a synchronization manager, such as synchronization manager 222, may receive a request to synchronize a specific application. Such a request may be generated by application server(s) 104 upon launching an application. Alternatively, or additionally, a synchronization request may be generated manually by providing a runtime command. The synchronization request may comprise several content requests for which to synchronize content. Content synchronization requests may comprise a list of requests, and/or any other information in any format that will allow the synchronization manager to identify which content is referenced by the application. Additionally or alternatively, the synchronization manager may employ other methods to identify referenced content on a given application. Such content requests may be stored at memory 214 or application servers(s) 104.

The synchronization manager, at operation 510, may traverse the content synchronization requests, and at operation 520, may search for content information associated with a content request. Such searching may comprise any of operations as illustrated and described with respect to FIG. 3 and/or FIG. 4. At operation 525, in an instance where the synchronization manager does not locate content information for a particular content synchronization request, the synchronization manager may cause writing of an alert to an alert file, at operation 530. Such writing of an alert may comprise an operation or operation(s) in accordance with operations 320 and/or 450. At operation 535, operations 510-530 may be repeated for each content request to be synchronized.

As described above, operations 510-535 provide for synchronizing referenced content with respect to content availability. In some embodiments, the synchronization service may perform operations 540-565 to ensure that mapped content is referenced from an application. For example, if new content is provided by a writer, the application should be made aware of that new content so that it may be displayed. Synchronizing an application according to both methods may be referred to as two-way synchronization. It will be appreciated that synchronizations may be implemented in one direction or the other (between application and content) or both directions, as in a two-way synchronization.

According to some embodiments, at operation 540, the synchronization manager 222 may receive content information for content available to the application requesting the synchronization. At operation 545, the synchronization manager 222 may search for content references associated with the provided content information. Such content references may be provided to content management apparatus 102 by application server 104 via the communication interface 218. At operation, 550, the synchronization manager 222 may determine whether or not a content item is referenced by an application. At 555, an alert may be written to an alert file, the alert containing content information for the unreferenced content information and/or a timestamp. At operation 565, the synchronization manager 222 may repeat operations 540-555 until references for all available content are searched.

In some embodiments, at operation 570, the synchronization manager may return a synchronization status to the calling application, such as one implemented on an application server 104. The status may be returned via communication interface 218. The application server 104 and/or the synchronization manager may cause the application synchronization information to be written to a synchronization log. A synchronization log may be stored on memory 214 and/or application server(s) 104, and may be in a variety of formats and may contain any information relating to the status of application synchronization, for any number of applications.

Figure 6:
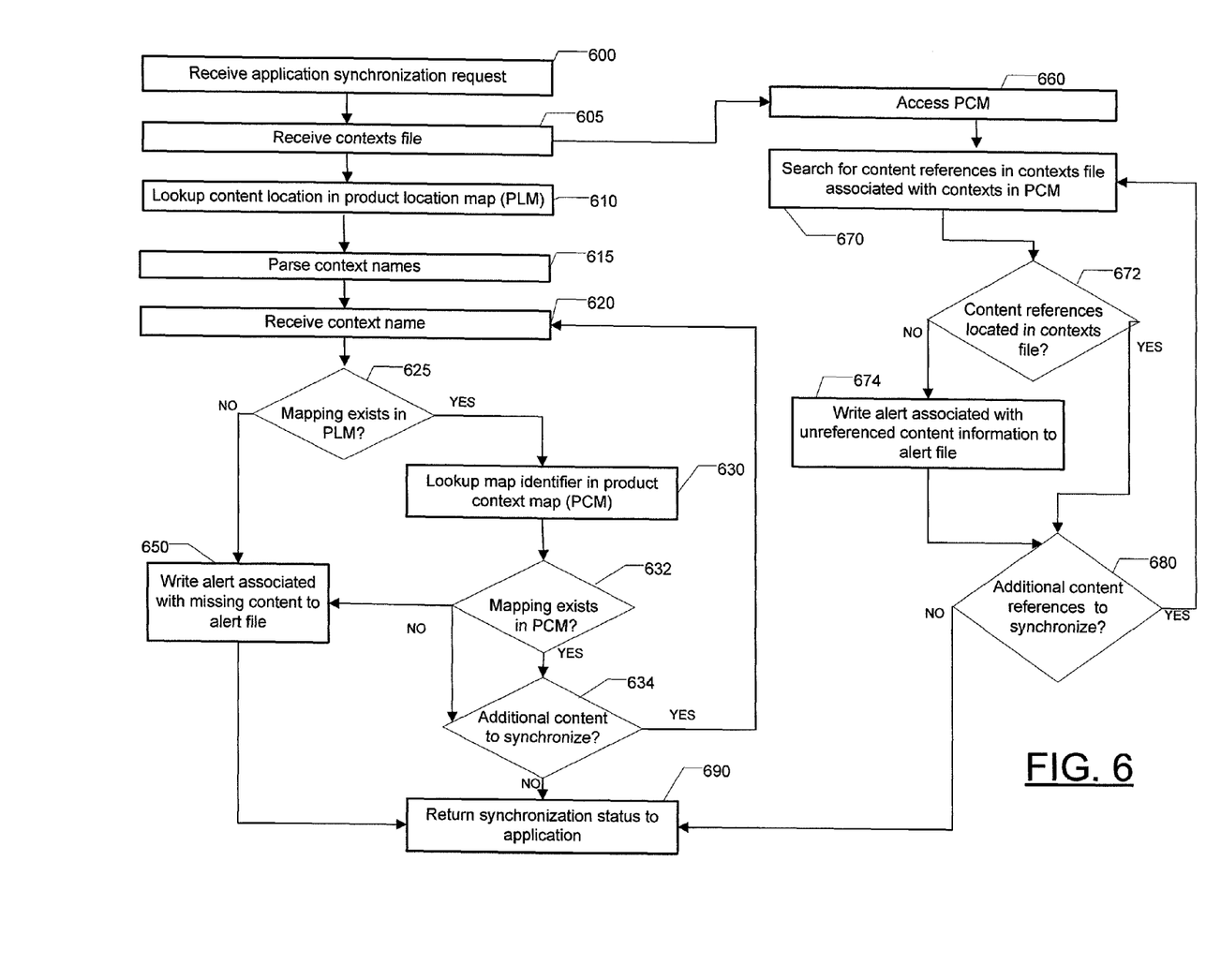
FIG. 6 illustrates a flowchart according to still further example embodiments.

FIG. 6 is a flowchart according to an example embodiment utilizing a synchronization manager on a system similar to the example system described with respect to FIG. 4. In this regard, the synchronization manager performing operations in FIG. 6 will be referred to as the synchronization service, as in some embodiments the synchronization manager may be implemented as a web service. In this example embodiment, at operation 600, the synchronization manager may receive a synchronization request comprising a contexts file, an application name, and/or any other information needed to identify an application and the context names referenced by the application. Additionally or alternatively, a contexts file, or the like, may be retrieved by the synchronization service at operation 605. A contexts file may comprise a comma delimited list of context names, and/or any other information in any format that will allow the synchronization manager to identify context names referenced by the application, and may be stored at memory 214 or application servers(s) 104. At operation 610, the synchronization service may look up the content location of the application in the PLM, as described previously with respect to operation 410. In an instance where the synchronization service fails to locate a location mapping for the given application, an alert may be written to an alert file at operation 650, and at operation 690, the synchronization service may cause synchronization information indicating a failure to be written to a synchronization log.

At operation 625, in an instance where the location of application content is located in a PLM, at operation 615, the synchronization service may parse a context file with processor 212 in order to identify context names to search for, and may store the context names at memory 214. The synchronization manager, at operation 620, may traverse the context names, and at operation 630, may search for content information associated with a context name in a PCM. Such searching may comprise operations as illustrated and described with respect to FIG. 3 and/or FIG. 4. At operation 632, if the context mapping is located, the synchronization for that context is deemed a success and the synchronization service may continue to synchronize other contexts. At operation 632, in an instance where the synchronization service does not locate content information for a particular context name, the synchronization service may cause writing of an alert to an alert file, at operation 650. Such writing of an alert may comprise an operation or operation(s) in accordance with operations 320 and/or 450. At operation 634, operations 620-650 may be repeated for each context name to be synchronized.

At operation 660, the synchronization service may access or otherwise receive the content mappings, such as, for example, a PLM and/or PCM. At operation 670, the synchronization service may traverse the mappings and search content references provided by an application server 104 to determine at operation 672 whether or not content mappings are referenced by an application. The synchronization service may cause writing of an alert regarding unreferenced content to an alert file at operation 674. In this regard, an alert may comprise a context name provided in a PCM to which no references are made. As such, a developer may access an alert and create application code to reference newly provided content. At operation 680, the synchronization service may repeat operation 670 until the service has searched for references to the provided content mappings.

In some embodiments, the synchronization service may write application synchronization information to a synchronization log at operation 690. A synchronization log may be stored on memory 214 or application server(s) 104, may be in a variety of formats, and may contain any information relating to the status of an application synchronization, for any number of applications. The following synchronization log is provided as a non-limiting example, in which synchronization information is written for numerous applications, and the synchronization information comprises a timestamp representing the date and time the synchronization was performed, an application name, and synchronization status.

```
Run on mm/dd/yy, hh:mm:ss
HCCT=Completed
************************************************
Run on mm/dd/yy, hh:mm:ss
HEC=Completed with mismatch
************************************************
Run on mm/dd/yy, hh:mm:ss
HCCT=Failed
************************************************
Run on mm/dd/yy, hh:mm:ss
HEN=Not Configured
************************************************
Run on mm/dd/yy, hh:mm:ss
HMM=Not Done
```

In the above example, a "Completed" status may mean the synchronization was successfully run, meaning there was no missing content information or unreferenced content. "Completed with mismatch" may indicate that content is mapped but not referenced by an application, and/or missing content information was logged to an alert file. A "Failed" status may signify any problem resulting in an attempted synchronization not completing, such as, for example, in an instance where an XML file is corrupted. A status of "Not configured" may signify an application not mapped in a PLM, an application for which a PCM is missing, and/or an application for which a synchronization mapping is missing. Finally, the "Not Done" status is used when a synchronization flag in a synchronization mapping for the respective application is set to false. In other words, synchronization is not configured to run for that particular application. It will be appreciated that these are example statuses and that any other status or statuses may be used to log the outcome of a synchronization.

Now having described some example embodiments, advantages to utilizing some example embodiments with regard to content management will be described. According to some embodiments, a development team may produce and deploy new code to application server(s) 104 on a routine basis. The application code may include calls to content not yet created. According to some embodiments, when the new content is referenced, an alert may be written to an alert file. Content writers may monitor the alert file and identify missing content information that needs to be provided. A content writer may decide whether to create content information or allow a corresponding content request to return default content. Such a process may be advantageous to any product development organization, but may be particularly beneficial to one structured in a way such that developers work independently, and/or perhaps even remotely, from content writers. In some embodiments, the alert files and synchronization logs may be utilized in a live environment in order to monitor potential problems with content. Such embodiments may results in significant cost reduction due to decreasing demand for communication needed between development teams and content writers.

Additionally or alternatively, some development organizations employing an example embodiment as described herein, may realize increased flexibility with regard to content creation and maintenance. In this regard, content may reside on a separate server from the application or can be built with the application. New content may be created without integrating with or building the application. According to some embodiments, a new context mapping may also be created without requiring application integration or builds.

FIGS. 3, 4, 5, and 6, each illustrate a flowchart of a system, method, and computer program product according to some example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may comprise one or more memory devices of a computing device (for example, the memory 214) storing instructions executable by a processor in the computing device (for example, by the processor 212). In some example embodiments, the computer program instructions of the computer program product(s) which embody the procedures described above may be stored by memory devices of a plurality of computing devices. As will be appreciated, any such computer program product may be loaded onto a computer or other programmable apparatus (for example, a content management apparatus 102 and/or other apparatus) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, a content management apparatus 102 and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    receiving at least one content request comprising an application name and application context of an application for which the content is requested;
    searching, with a processor, for content information associated with the content request;
    in an instance in which the content information is located, providing the content information, wherein the content information is located based on the application name and the application context; and
    in an instance in which the content information is not located during the searching, causing writing of an alert associated with a missing content information to an alert file.

2. A method according to claim 1, wherein the content information comprises a location and map identifier.

3. A method according to claim 2, wherein searching for content information comprises:
identifying the map identifier in a product context map based on at least one of the application name and application context; and
identifying the location in a product location map based on at least the application name.

4. A method according to claim 3, further comprising causing display of content based on at least the location and map identifier.

5. A method according to claim 1 wherein the receiving at least one content request comprises receiving an application synchronization request, and wherein the method further comprises:
causing writing of application synchronization information to a synchronization log.

6. A method according to claim 1, further comprising providing default content information in the instance in which the content information is not located during the searching.

7. A method according to claim 1, further comprising causing writing of access information to an audit log.

8. An apparatus for managing content, the apparatus comprising processing circuitry configured to cause the apparatus to at least:
receive at least one content request comprising an application name and application context of an application for which the content is requested;
search for content information associated with the content request;
in an instance in which the content information is located, provide the content information, wherein the content information is located based on the application name and the application context; and
in an instance in which the content information is not located during the searching, cause writing of an alert associated with a missing content information to an alert file.

9. An apparatus according to claim 8, wherein:
the content information comprises a location and map identifier.

10. An apparatus according to claim 9, wherein searching for content information comprises:
identifying the map identifier in a product context map based on at least one of the application name and application context; and
identifying the location in a product location map based on at least the application name.

11. An apparatus according to claim 10, wherein the processing circuitry is further configured to cause display of content based on at least the location and map identifier.

12. A apparatus according to claim 8, wherein the receiving at least one content request comprises receiving an application synchronization request, and wherein the processing circuitry is further configured to cause writing of application synchronization information to a synchronization log.

13. A apparatus according to claim 8, wherein the processing circuitry is further configured to provide default content information in the instance in which the content information is not located during the searching.

14. An apparatus according to claim 8, wherein the processing circuitry is further configured to cause writing of access information to an audit log.

15. A computer program product for managing content comprising at least one non-transitory computer-readable medium having computer-readable program instructions stored therein, the computer-readable program instructions comprising instructions, which when performed by an apparatus, are configured to cause the apparatus to at least:
receive at least one content request comprising an application name and application context of an application for which the content is requested;
search for content information associated with the content request;
in an instance in which the content information is located, provide the content information, wherein the content information is located based on the application name and the application context; and
in an instance in which the content information is not located during the searching, cause writing of an alert associated with a missing content information to an alert file.

16. A computer program product according to claim 15, wherein:
the content information comprises a location and map identifier.

17. A computer program product according to claim 16, wherein searching for content information comprises:
identifying the map identifier in a product context map based on at least one of the application name and application context; and
identifying the location in a product location map based on at least the application name.

18. A computer program product according to claim 17, wherein the instructions are further configured to cause the apparatus to cause display of content based on at least the location and map identifier.

19. A computer program product according to claim 15, wherein the receiving at least one content request comprises receiving an application synchronization request, and wherein the instructions are further configured to cause the apparatus to cause writing of application synchronization information to a synchronization log.

20. A computer program product according to claim 15, wherein the instructions are further configured to cause the apparatus to provide default content information in the instance in which the content information is not located during the searching.

21. A computer program product according to claim 15, wherein the instructions are further configured to cause the apparatus to cause writing of access information to an audit log.

22. The method according to claim 1, wherein the alert file is stored remotely from a device on which the content request is generated.

* * * * *